United States Patent [19]

Lepitre et al.

[11] Patent Number: 5,524,122
[45] Date of Patent: Jun. 4, 1996

[54] SYSTEM AND METHOD FOR ADAPTING THE TRANSMISSION RATE TO THE LINE QUALITY AND MODEM SUITABLE FOR SUCH A SYSTEM

[75] Inventors: Didier Lepitre, Paris; Catherine Picart, Wissous, both of France

[73] Assignee: U.S. Philips Corporation, New York, N.Y.

[21] Appl. No.: 302,573

[22] Filed: Sep. 8, 1994

[30] Foreign Application Priority Data

Sep. 13, 1993 [FR] France ................................. 93 10870

[51] Int. Cl.$^6$ .................................................. H04L 29/08
[52] U.S. Cl. ............................ 375/222; 375/225; 375/377
[58] Field of Search ................................. 371/5.5; 370/13,
370/17, 24, 32.1, 79, 84, 119; 375/219,
225, 377, 222

[56] References Cited

U.S. PATENT DOCUMENTS

| | | | |
|---|---|---|---|
| 4,736,388 | 4/1988 | Eguchi | 371/5.5 |
| 4,991,184 | 2/1991 | Hashimoto | 371/5.5 |
| 5,157,651 | 10/1992 | Ghelberg et al. | 370/84 |
| 5,214,637 | 5/1993 | Sridhar et al. | 375/225 |
| 5,247,546 | 9/1993 | Abbiate et al. | 370/84 |

FOREIGN PATENT DOCUMENTS 62-266581  4/1989  Japan.

*Primary Examiner*—Benedict V. Safourek
*Attorney, Agent, or Firm*—Leroy Eason

[57] ABSTRACT

A transmission system wherein the data transmission rate is optimized for communication between modems which are each capable of operating at various transmission rates and wherein the transmission medium is of variable quality. Prior to synchronization each modem determines an optimum transmission rate based on line quality, and during a synchronization setup phase the modems exchange information identifying their minimum and maximum acceptable transmission rates. An initial transmission rate is adopted and then adjusted up or down, depending on line quality, so that the rate is as close to the optimum rate as is consistent with line quality and the rates acceptable to both modems. Thus, the optimum rate calculated by each modem is taken into account and is imposed on the remote modem only if the latter is capable of operation at that rate. The system is therefore highly flexible and also reliable.

2 Claims, 2 Drawing Sheets

SYSTEM AND METHOD FOR ADAPTING THE TRANSMISSION RATE TO THE LINE QUALITY AND MODEM SUITABLE FOR SUCH A SYSTEM

BACKGROUND OF THE INVENTION

1. Field of the Invention

The present invention relates to a transmission system for connecting modems which have various common transmission rates, and to means for adapting the transmission rate to the line quality. Such means provides, during a synchronization set-up phase of a communication, for:

exchanging between the modems relating to their transmission rates, providing a measurement of the quality of the transmission medium, changing the rate as a function of said measurement.

The invention also relates to a method of adapting the transmission rate to the line quality and relates to modems implementing said method.

2. Description of the Related Art

Transmission media are subjected to temporary disturbance (impulse noise, amplitude jumps) or permanent disturbance during the whole connection (white noise), which thus causes frequent resynchronizations or a high error rate to occur. The resynchronizations interrupt the data transmission for several seconds.

There is thus the problem of transmission rate adaptation between two modems (a local modem and a remote modem) as a function of the quality of the line and of the rate capacities of the remote modem. This is described in Japanese Patent Application no. 62-266581 of 23 Oct. 1987, published under number 1-109935. That Application implies that tile modems know each other perfectly well.

Currently, modems are proposed which are capable of transmitting data at 7 different rates: from 4800 bits/s to 19200 bits/s in steps of 2400 bits/s, for example. Thus the problem of adaptation to the right rate is much more acute.

The present invention proposes a system which permits connecting modems which have various rates, so that they can mutually adapt their rate.

Therefore, a system of the type described in the opening paragraph is characterized in that for connecting a local modem to a remote modem which includes a synchronization phase, it further comprises prior to the whole synchronization step defining:

a minimum exchange rate, rate_min(exchange), which is the greater of the values rat_min(local) and rate_min(remote), where rate_min(local) and rate_min(remote) are the minimum acceptable rates for the local and remote modems; and respectively, a maximum exchange rate, rate_max(exchange), which rate_max(exchange) is the smaller of the values rate_max(local) and rate_ max(remote), where rate_max(local) and rate_max(remote) are the maximum acceptable rates for the local and remote modems, respectively.

The system is also used after the synchronization phase, for establishing the "rate_trans" that being the transmission rate defined by the quality of the transmission medium.

BRIEF DESCRIPTION OF THE DRAWING

The following description made with reference to the annexed drawings, all given by way of non-limiting example, will provide a more complete understanding of the invention. In the drawings.

DESCRIPTION OF THE PREFERRED EMBODIMENTS

Figure 1:
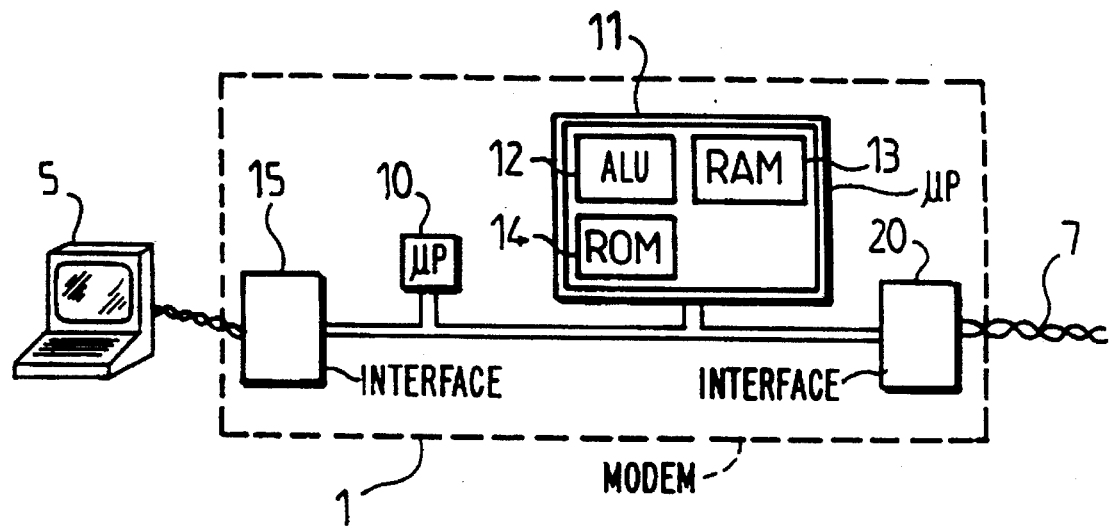
FIG. 1 shows a modem according to the invention.
Figure 2:
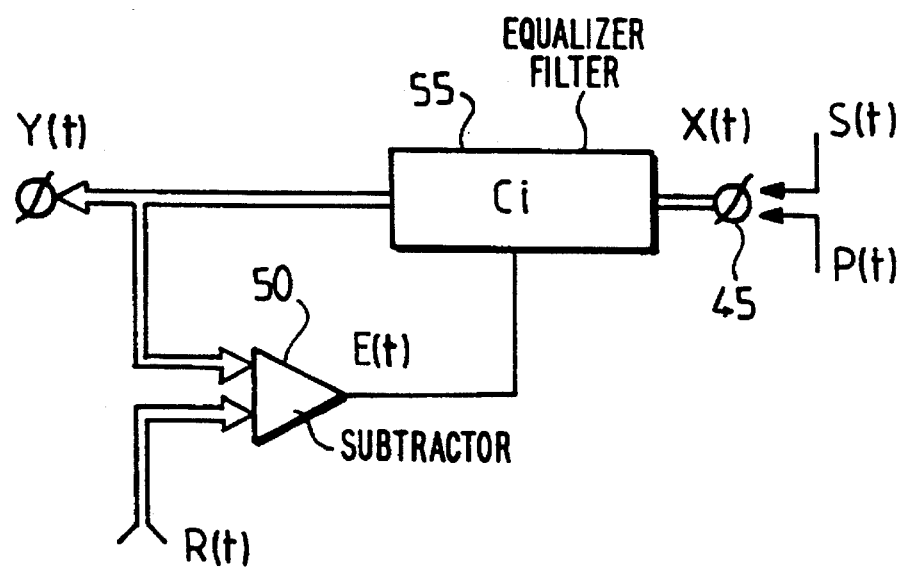
FIG. 2 is a functional block diagram of the modem shown in FIG. 1.

The modem 1 shown in FIG. 1 interconnects a digital-type terminal 5 and a telephone-type transmission line 7. This modem is constituted based upon microprocessor units 10 and 11. Unit 10 is assigned to the management of the modem and unit 11 is operates as a signal processor which comprises, habitually, a calculation unit (ALU) 12, a random-access memory 13 and a read-only memory 14 containing the program of instructions which implement the method of the invention. A first interface circuit 15 makes it possible to connect the modem 1 to the terminal 5. A second interface circuit 20 makes it possible to transform on the one hand the signals coming from the telephone line 7 into digital signals and, on the other, to carry out the reverse operation. Such a circuit is described in European Patent Application EP 0 318 105. Unit 11 carries out various functions and, in particular, transmission channel equalization. This function is carried out by the functional units shown in FIG. 2.

The signal to be filtered X(t) is received at access 45 coming from line 7, and is the sum of a payload signal S(t) and line disturbance P(t). The filtered signal Y(t) is compared with a reference signal R(t) by a subtracter element 50. The result is an error signal E(t) which adjusts the coefficients of an equalization filter 55. This filter is characterized by its impulse response H(t,C) which depends on a set of coefficients denoted C. The control of the equalization coefficients is realised by an iterative gradient algorithm via error minimization.

The applicable equation is the following:

$$C_l^{(n+1)} = C_l^{(n)} - \alpha E^{(nT)} \cdot \frac{\delta y^{(nT)}}{\delta C_l^{(n)}}$$

in which C is a filter coefficient and T is the iteration step. The value of $\alpha$ is important; it is the gain of the equalizer, and determines the duration of the convergence and the value of the residual error.

The error signal E(t) is also used according to the invention for measuring the quality of the transmission medium. The transmission medium is said to be of poor quality if:

the instantaneous error ratio is higher than a threshold $S_{r1}$, the mean error ratio over 5 seconds is higher than a threshold $S_{r2}$, or the mean error ratio over 5 minutes is higher than a threshold $S_{r3}$.

The transmission medium is said to be of good quality if:

the instantaneous error ratio is lower than a threshold $S_{m1}$, and the mean error ratio over 5 seconds is lower than a threshold $S_{m2}$, or the mean error ratio over 5 minutes is lower than a threshold $S_{m3}$.

Each of these thresholds is a constant factor determined as a function of the transmission rate and of the corresponding criterion.

Figure 3:
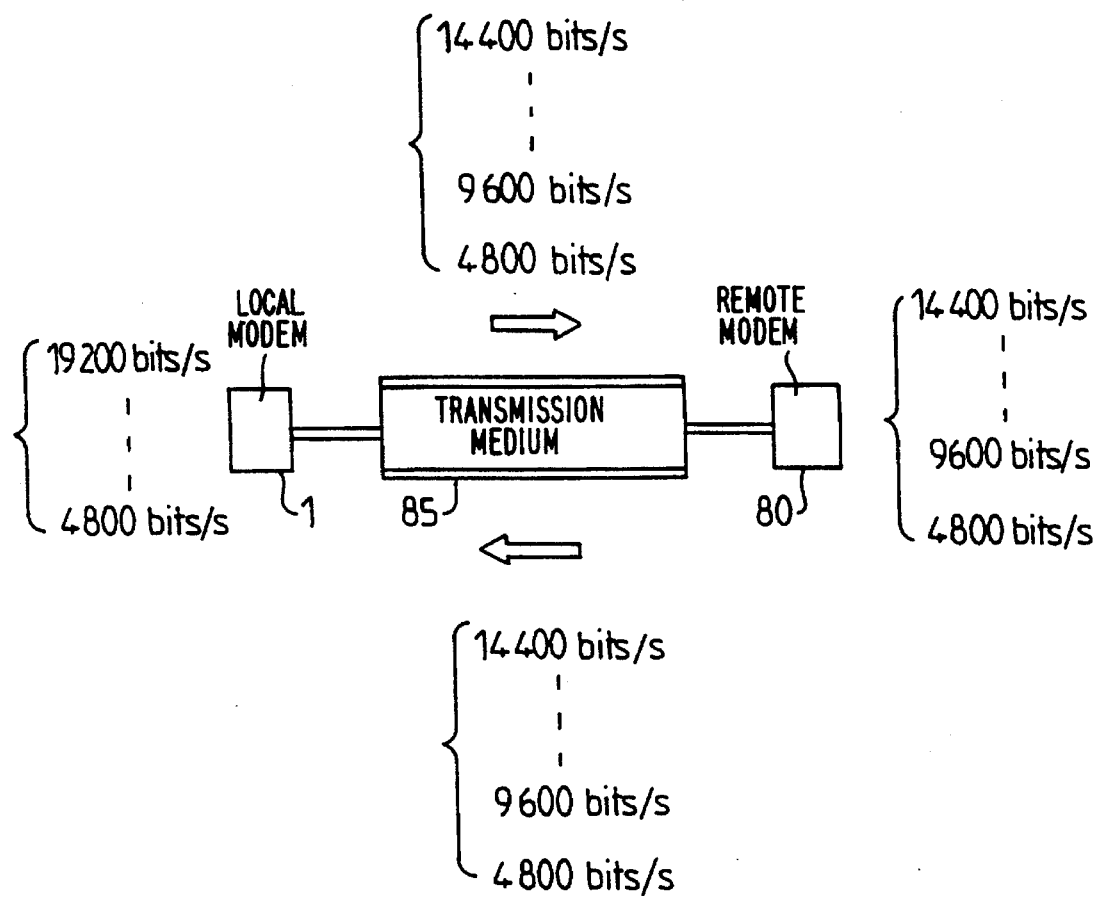
FIG. 3 shows a system according to the invention having a configuration of two modems according to the invention connected to each other.

FIG. 3 shows a system with two modems 1 and 80 separated by a transmission medium 85. Modem 1 will be considered the local modem and modem 80 the remote modem. The remote and local modems may have different rates varying in steps of 2400 bits/s. For example, the local modem 1 tolerates rates from 4800 bits/s to 19200 bits/s, whereas the remote modem 80 only tolerates rates from 9600 bits/s to 14400 bits/s. It is thus necessary that changes of the rates remain compatible with the modems while taking the quality of the transmission medium into consideration.

First of all the following rates will be defined:

(1) rate_min(local):

minimum rate acceptable to the local modem, (2) rate_max(local):

maximum rate acceptable to the local modem. These values depend, by composition, on the local modem.

(3) rate_min(remote):

minimum rate acceptable to the remote modem, (4) rate_max(remote):

maximum rate acceptable to the remote modem. These values depend, by composition, on the remote modem.

(5) rate_trans:

real transmission rate at a given instant, (6) rate_opt:

optimum calculated rate depending on the quality of the line for the direction of transmission from the remote modem to the local modem, (7) rate_min(exchange):

minimum rate common to the two modems, (8) rate_max(exchange):

maximum rate common to the two modems,

Before the connection is switched on, the parameters are initially set as follows:

rate_min(exchange)=rate_min(remote)=rate_min(local)

rate_max(exchange)=rate_max(remote)=rate_max(local)

After the connection is switched on (by the signals R1, R2 transmitted at 4800 bits/s, as this is defined by the V32 standard of the CCITT), the local modem is told the tolerances of the remote modem and the remote modem is told the tolerances of the local modem.

Thus one has:

rate_min(exchange)=max{rate_min(local); rate_min(remote)} rate_max(exchange)=min{rate_max(local); rate_max(remote)} rate_trans=4800 bits/s which is the rate defined by the standard at the start).

The rate may be changed if:

rate_opt≠rate_trans

The rate is to be lowered if the following conditions are met:

rate_opt<rate_trans rate_min(exchange)<rate_trans

The rate is to be raised if the following conditions are met:

rate_opt>rate_trans rate_max(exchange)>rate_trans

The calculation of the optimum rate does not directly depend on the capacities of the modem. The following holds:

If the quality of the line is considered poor, an optimum rate rate_opt is defined as:

rate_opt=max{rate_trans—rate variation; rate_min(local)}

If the quality of the line is considered good:

rate_opt =min}rate_trans+rate variation; rate_max(local)} where in practice the rate variation is 2400 bits/s.

The initial synchronization of the modems is always effected at the rate_max(exchange). When the rate is lowered, rate_max(exchange) assumes the value of rate_ trans. The rising of the rate is thus blocked. To avoid the blocking in the case where the criterion of rate increase has been adhered to for 10 minutes, and if the rate_opt is not higher than rate_max(remote) nor than rate_max(local), the value of rate_max(exchange) becomes:

rate_max(exchange)=rate_opt.

In order that this change of rate can be effected, the synchronization sequence is relaunched and said signals R1 and R2 are used to make this change possible.

Thus, due to the method, the optimum rate calculated by one of the modems is taken into account and is imposed on the remote modem only if the latter is in a position to accept. The advantage of this is that the decision can be made by either of the modems and thus solves the problem of dissymmetrical links.

This makes the procedure highly flexible, but also reliable, because each modem is informed of the acceptable rates by the remote modem and will not ask for an unacceptable change of rate.

Example of use (see FIG. 3)

It will be recollected that modem 1 has the following rate capacities: 19200 bits/s to 4800 bits/s, and modem 80: 14400 bits/s to 9600 bits/s. Assume that the transmission medium in the direction from modem 1 towards modem 80 becomes degraded and then, after several minutes, the quality is restored again.

Here are the resultant changes of the rate:

Modem 1.

rate_max(local) = 19200 bits/s
rate_min(local) = 4800 bits/s
Modem 80.

rate_max(local) = 14400 bits/s
rate_min(local) = 9600 bits/s
          STARTING SYNCHRONISATION
Modem 1.

rate_max(remote) = 14400 bits/s
rate_min(remote) = 9600 bits/s
rate_max(exchange) = 14400 bits/s
rate_min(exchange) = 9600 bits/s
rate_trans    = 14400 bits/s
Modem 80.

rate_max(remote) = 19200 bits/s
rate_min(remote) = 4800 bits/s
rate_max(exchange) = 14400 bits/s
rate_min(exchange) = 9600 bits/s
rate_trans    = 14400 bits/s
        Modem 1: RATE_OPT = 16800 bits/S
        Modem 8: RATE_OPT = 12000 bits/S
        ↓
    RATE REDUCTION BY MODEM 80
Modem 1.

rate_max(exchange) = 12000 bits/s
rate_min(exchange) = 9600 bits/s
rate_trans    = 12000 bits/s
Modem 80.

```
rate_max(exchange) = 12000 bits/s
rate_min(exchange) = 9600 bits/s
rate_trans       = 12000 bits/s
            Modem 1: RATE_OPT = 14400 bits/s
            Modem 80: RATE_OPT = 9600 bits/s
                    ↓
         RATE REDUCTION BY MODEM 80
Modem 1.

rate_max(exchange) = 9600 bits/s
rate_min(exchange) = 9600 bits/s
rate_trans       = 9600 bits/s
Modem 80.

rate-max(exchange) = 9600 bits/s
rate_min(exchange) = 9600 bits/s
rate_trans       = 9600 bits/s
            Modem 1: RATE_OPT = 12000 bits/s
            Modem 80: RATE_OPT = 7200 bits/s
                    ↓
              NO CHANGE OF RATE
    THE QUALITY OF THE LINE BECOMES GOOD AGAIN
Modem 1.

rate_max(exchange) = 9600 bits/s
rate_min(exchange) = 9600 bits/s
rate_trans       = 9600 bits/s
Modem 80.

rate_max(exchange) = 9600 bits/s
rate_min(exchange) = 9600 bits/s
rate trans       = 9600 bits/s
            Modem 1: RATE_OPT = 12000 bits/s
            Modem 80: RATE_OPT = 12000 bits/s
                    ↓
      MONITORING OF THE RATE RATE_OPT (*)
                FOR 10 MINUTES
                    ↓
            Modem 1: RATE_OPT = 12000 bits/s
            Modem 80: RATE_OPT = 12000 bits/s
                    ↓
            RATE RAISED BY MODEM 1
Modem 1.

rate_max(exchange) = 12000 bits/s
rate_min(exchange) = 9600 bits/s
rate_trans       = 12000 bits/s
Modem 80.

rate_min(exchange) = 12000 bits/s
rate_min(exchange) = 9600 bits/s
rate_trans       = 12000 bits/s
            1: RATE_OPT = 14400 bits/s
            80: RATE_OPT = 14400 bits/s
                    ↓
      MONITORING OF THE RATE RATE_OPT (*)
                FOR 10 MINUTES
                    ↓
            1: RATE_OPT = 14400 bits/s
            80: RATE_OPT = 14400 bits/s
                    ↓
       RATE RAISED BY MODEM 1 OR MODEM 80
Modem 1.

rate_max(exchange) = 14400 bits/s
rate_min(exchange) = 9600 bits/s
rate_trans       = 14400 bits/s
Modem 80.

rate_max(exchange) = 14400 bits/s
rate_min(exchange) = 9600 bits/s
rate_trans       = 14400 bits/s
            Modem 1: RATE_OPT = 16800 bits/s
            Modem 80: RATE_OPT = 16800 bits/s
                    ↓
              NO CHANGE OF RATE
```

It will be noted that to avoid an incessant weighing between two adjacent rates, the lowering and rising thresholds are defined for each criterion with a hysteresis of 0.1 between the two thresholds (i.e. about 3 dB).

(* the error ratio is satisfactory for this duration and a rise of the rate is considered).

We claim:

1. A method of operation of a transmission system which includes a local modem, a remote modem, and a transmission medium over which data is transmitted there-between in both directions; each modem having a plurality of acceptable transmission rates at least some of which are common to both modems; said method comprising the steps of:

A) during a synchronization setup phase prior to data transmission between said modems over said transmission medium,
   i) exchanging information between said modems over said transmission medium identifying their respective minimum and maximum acceptable data transmission rates;
   ii) evaluating the transmission quality of the transmission medium in each direction, and based thereon determining optimum transmission rates for data transmission in each direction; and
   iii) changing an initially selected transmission rate for data transmission over said transmission medium as a function of said optimum transmission rates;

B) prior to said synchronization setup phase,
   i) determining a minimum exchange rate which is the greater of the minimum acceptable transmission rates of both of said modems; and
   ii) determining a maximum exchange rate which is the lesser of the maximum acceptable transmission rate of both of said modems; and C) following said synchronization setup phase, changing the transmission rate between said modems so as to conform to said optimum transmission rates to an extent which is consistent with the minimum and maximum exchange rates of both of said modems.

2. A method as claimed in claim 1, wherein in step (A) thereof:

the transmission quality of the transmission medium is evaluated as being either poor or good in each direction;

when the transmission quality of the transmission medium in a direction from the remote medium to the local modem is evaluated as being poor, the optimum transmission rate in such direction is determined as the greater of (i) the minimum acceptable transmission rate of the local modem, and (ii) the difference between the then existing transmission rate and a transmission rate variation which is tolerable to the local modem;

when the transmission quality of the transmission medium in a direction from the remote modem to the local modem is evaluated as being good, the optimum transmission rate in such direction is determined as the lesser of (i) the maximum acceptable transmission rate of the local modem, and (ii) the sum of the then existing transmission rate and said transmission rate variation which is tolerable to the local modem; and the initially selected transmission rate is changed so that (i) it is lowered when the optimum rate in a given direction and the minimum rate common to both modems are both lower than the initially selected rate; and (ii) it is raised when the optimum rate in a given direction and the maximum rate common to both modems are both higher than the initially selected rate.

* * * * *